United States Patent
Chang

(10) Patent No.: US 11,838,255 B2
(45) Date of Patent: Dec. 5, 2023

(54) MAIL PROCESSING METHOD AND APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventor: Junying Chang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/883,752

(22) Filed: Aug. 9, 2022

(65) Prior Publication Data

US 2022/0385612 A1 Dec. 1, 2022

Related U.S. Application Data

(63) Continuation of application No. PCT/CN2021/086512, filed on Apr. 12, 2021.

(30) Foreign Application Priority Data

Apr. 30, 2020 (CN) .......................... 202010366947.X

(51) Int. Cl.
*G06F 15/16* (2006.01)
*H04L 51/216* (2022.01)

(52) U.S. Cl.
CPC ................................ *H04L 51/216* (2022.05)

(58) Field of Classification Search
CPC .................................................. H04L 51/216
USPC ........................................................ 709/206
See application file for complete search history.

(56) References Cited

U.S. PATENT DOCUMENTS

| 2006/0036697 | A1 | 2/2006 | Lin et al. |
| 2009/0043852 | A1 | 2/2009 | Weir et al. |
| 2009/0216843 | A1* | 8/2009 | Willner ................ H04L 51/42 709/206 |
| 2012/0117457 | A1 | 5/2012 | Yuniardi |
| 2012/0151377 | A1 | 6/2012 | Schultz et al. |

(Continued)

FOREIGN PATENT DOCUMENTS

| CN | 101364956 A | 2/2009 |
| CN | 102567799 A | 7/2012 |

(Continued)

OTHER PUBLICATIONS

Search Report and Written Opinion dated Jul. 8, 2021 in PCT Application No. PCT/2021/086512, English Translation of Search Report only (13 pages).

(Continued)

*Primary Examiner* — Imad Hussain

(57) ABSTRACT

A mail processing method and apparatus, an electronic device and a storage medium are provided. The method comprises: acquiring, in response to detection of a preset operation triggered based on a target mail, at least one collaborative user; and sharing a target link corresponding to the target mail with each collaborative user, in order that each collaborative user reads the target mail based on the target link and/or edits the target mail based on the target link. The target mail comprises at least one of: content of the target mail and content of a draft reply to the target mail.

18 Claims, 5 Drawing Sheets

(56) References Cited

U.S. PATENT DOCUMENTS

| | | | |
|---|---|---|---|
| 2012/0198003 A1 | 8/2012 | Schechter et al. | |
| 2013/0080545 A1 | 3/2013 | Datta | |
| 2014/0365886 A1* | 12/2014 | Koenig | G06F 3/04855 |
| | | | 715/711 |
| 2015/0156153 A1* | 6/2015 | Deselaers | H04L 51/42 |
| | | | 709/206 |
| 2015/0277725 A1 | 10/2015 | Masterson et al. | |
| 2016/0087930 A1 | 3/2016 | Vembu et al. | |
| 2016/0182412 A1* | 6/2016 | Kabbes | G06Q 10/10 |
| | | | 709/206 |
| 2019/0179501 A1* | 6/2019 | Seeley | G06F 3/0484 |

FOREIGN PATENT DOCUMENTS

| | | |
|---|---|---|
| CN | 102567801 A | 7/2012 |
| CN | 102930424 A | 2/2013 |
| CN | 104753771 A | 7/2015 |
| CN | 106164952 A | 11/2016 |
| CN | 108156070 A | 6/2018 |
| CN | 111581924 A | 8/2020 |

OTHER PUBLICATIONS

First Office Action generated in 2021 in CN Application No. 202010366947.X, English Translation (21 pages).
Second Office Action generated in Oct. 20, 2021 in CN Application No. 202010366947.X, English Translation (11 pages).
Extended European Search Report dated May 25, 2023 in European Application No. 21796027.7 (12 pages).

* cited by examiner

MAIL PROCESSING METHOD AND APPARATUS, ELECTRONIC DEVICE AND STORAGE MEDIUM

This application is a continuation application of International Application No. PCT/CN2021/086512, filed on Apr. 12, 2021, which claims the priority to Chinese Patent Application No. 202010366947.X titled "MAIL PROCESSING METHOD AND APPARATUS, ELECTRONIC DEVICE AND STORAGE MEDIUM", filed on Apr. 30, 2020 with the China National Intellectual Property Administration (CNIPA), both of which are incorporated herein by reference in entireties.

FIELD

The present disclosure relates to the field of computer technology, and in particular to a method and an apparatus for processing a mail, an electronic device and a storage medium.

BACKGROUND

Nowadays, email is frequently used office software.

Conventionally, a user who wants to discuss a mail with others when reading or replying to the mail needs to forward the mail to relevant users, and then discusses the mail by means of other communication tools or in a face-to-face way, resulting in a complicated process and inefficient communication.

SUMMARY

A method and an apparatus for processing a mail, an electronic device and a storage medium are provided according to embodiments of the present disclosure, in which the user can edit the mail and conduct discussion on a corresponding area of the mail while reading the mail, to improve efficiency in mail processing and improve user experience.

A method for processing a mail is provided according to a first aspect of the present disclosure. The method includes acquiring, in response to detection of a preset operation triggered based on a target mail, at least one collaborative user; and sharing a target link corresponding to the target mail with each collaborative user, in order that each collaborative user reads the target mail based on the target link and/or edits the target mail based on the target link, where the target mail comprises at least one of content of the target mail and content of a draft reply to the target mail.

An apparatus for processing a mail is provided according to a second aspect of the present disclosure. The apparatus includes a collaborative user determining module, configured to: acquire, in response to detection of a preset operation triggered based on a target mail, at least one collaborative user; and a mail-sharing module, configured to: share a target link corresponding to the target mail with each collaborative user, in order that each collaborative user reads the target mail based on the target link and/or edits the target mail based on the target link, where the target mail comprises at least one of content of the target mail and content of a draft reply to the target mail.

An electronic device is provided according to a third aspect of the present disclosure. The electronic device includes:

one or more processors; and a memory for storing one or more programs, where the one or more processors, when executing the one or more programs, perform the foregoing method for processing a mail.

A storage medium comprising computer executable instructions is further provided according to a fourth aspect of the present disclosure. The computer executable instructions, when being executed by a computer processor, perform the foregoing method for processing a mail.

According to the technical solution of the embodiment of the present disclosure, at least one collaborative user is acquired in response to detection of a preset operation triggered based on a target mail; and a target link corresponding to the target mail is shared with each collaborative user, so that each collaborative user can read the target mail and/or edit the target mail based on the target link, where the target mail includes at least one of the content of the target mail and the content of the draft reply to the target mail.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION

Figure 1:
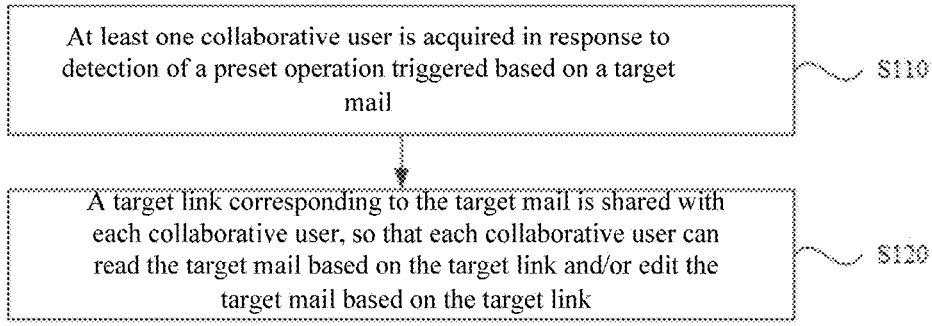
FIG. 1 is a schematic flow chart of a method for processing a mail according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include additional steps and/or omit a step shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first", "second" or the like used in the present disclosure are used to distinguish different devices, modules or units from one another, and are not used to limit a sequential order or interdependence of the functions performed by the devices, modules or units.

It should be noted that the wordings such as "one" and "multiple" in the present disclosure are illustrative rather than restrictive. Those skilled in the art should understand that the wording should be understood as "one or more" unless otherwise expressly indicated in the context.

First Embodiment

FIG. 1 is a schematic flow chart of a method for processing a mail according to a first embodiment of the present disclosure. The embodiment of the present disclosure is applicable to a case where at least two users discuss a mail. The method may be implemented by an apparatus for processing a mail. The apparatus may be implemented in a form of software and/or hardware. Alternatively, the apparatus may be implemented by an electronic device, and the electronic device may be a mobile terminal, a PC terminal, or the like.

As shown in FIG. 1, the method for processing a mail according to the embodiment includes the following steps S110 and S120.

In step S110, at least one collaborative user is acquired in response to detection of a preset operation triggered based on a target mail.

If at least two users need to discuss the mail, the mail may be forwarded to users participating in the discussion, so that the users participating in the discussion discuss based on the mail. The mail may serve as a target mail, and the users participating in the discussion may serve as collaborative users. In other words, in a case that a target user shares a current mail with another user, the user who receives the target mail serves as the collaborative user. Alternatively, the mail may be shared with a user related to the mail, and the user related to the mail serves as the collaborative user. Alternatively, the mail may be shared with all people in an IM group or an organization, and thus the people in the IM group or the organization may serve as the collaborative users. The preset operation may be an operation of adding at least one collaborative user.

In a case that it is detected that the target user triggers a control for adding at least one collaborative user, a user list acquisition program is called to acquire a user list. In an embodiment, the user list pops up on a page to which the target mail belongs, so that the user can select a user from the user list; and/or an input control for entering a username pops up at a preset location of the target mail, so that the target user can enter a name, a job number, a mail address, or other information of a user in the input control.

Figure 2:
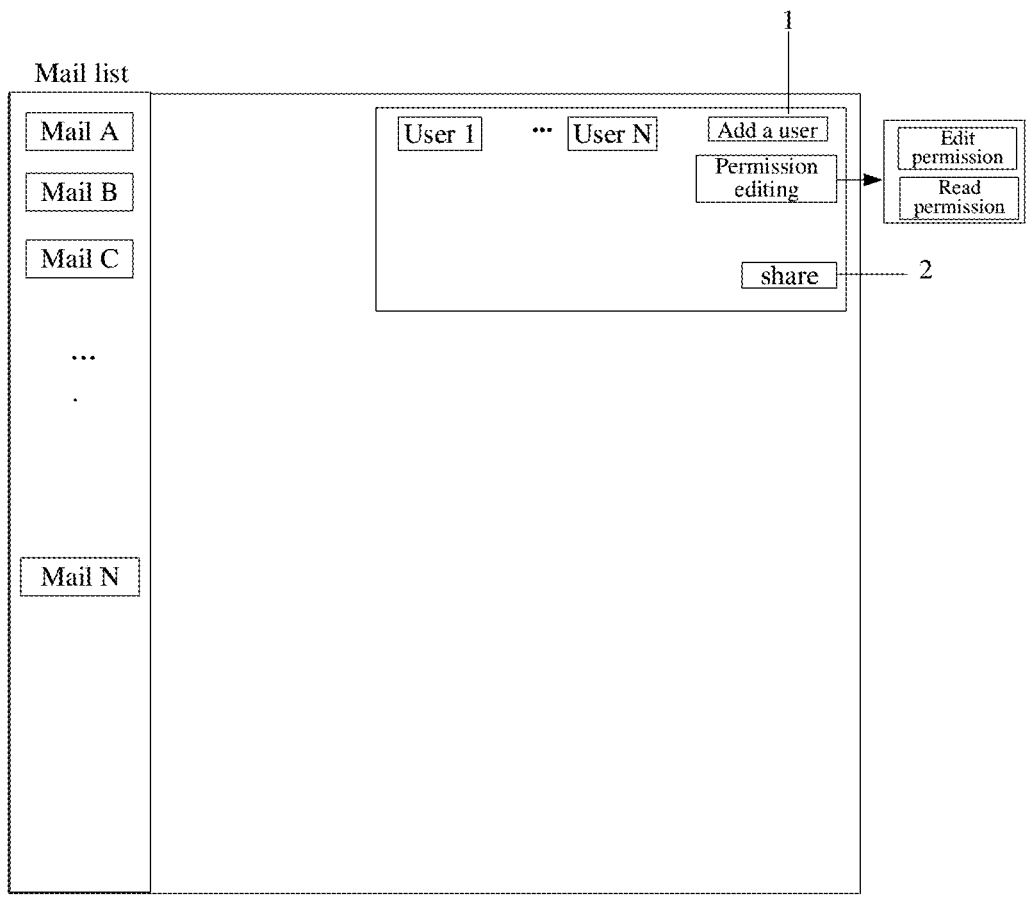
FIG. 2 is a schematic diagram of an interface used in the method for processing a mail according to the first embodiment of the present disclosure.

For example, as shown in FIG. 2, triggering of the preset operation is implemented by triggering a preset control 1. The preset control is used to add a collaborative user. When the target user clicks on the preset control 1 at the upper right corner for adding a collaborative user, a server corresponding to the mail may detect a triggering operation of the user, and retrieve the user list and pop up a dialog box for adding a user based on the triggering operation, so that the target user can select the collaborative user from the user list, or enter information representing an identity of the collaborative user, such as a name, a job number or a mail address of the collaborative user, in the dialog box. The added collaborative user may be displayed in the preset location of the page to which the target mail belongs. For example, as shown in FIG. 2, users 1 to N are the collaborative users added by the target user.

In step S120, a target link corresponding to the target mail is shared with each collaborative user, so that each collaborative user can read the target mail based on the target link and/or edit the target mail based on the target link.

The target link is shared with the collaborative user by triggering a sharing control. The sharing control is used to share the target mail with the collaborative user. The target mail includes at least one of: content of the target mail and content of a draft reply to the target mail.

After the collaborative user is selected, the sharing control may be clicked. Based on a triggering operation of the target user, the target link corresponding to the target mail may be generated, and the target link may be sent to each collaborative user, to allow each collaborative user link to the page to which the target mail belongs based on the target link, so that each collaborative user can read the target mail online and/or edit the target mail online, and the edited content can be synchronized to a terminal of each collaborative user.

It should be noted that multiple collaborative users may link to the target mail based on the target link and read the mail at the same time. When multiple collaborative users are processing the target mail, an avatar or a job number of each collaborative user may be displayed at preset location of the target mail, that is, a collaborative user who is currently reading the mail may be displayed in the target mail. When some users are editing a draft in a draft control, other collaborative users who are reading the target mail may see the draft currently being edited and the users who are editing the draft.

For example, as shown in FIG. 2, when the target user clicks on a sharing control 2, the target link corresponding to the target mail may be sent to each collaborative user. Each collaborative user may read the target mail and/or edit the target mail based on the target link.

According to the technical solution of the embodiment of the present disclosure, at least one collaborative user is acquired in response to detection of a preset operation triggered based on a target mail; and a target link corresponding to the target mail is shared with each collaborative user, so that each collaborative user can read the target mail and/or edit the target mail based on the target link, where the target mail includes at least one of the content of the target mail and the content of the draft reply to the target mail, which can solve the technical problem in the conventional technology that a user is required to forward a mail to relevant users when discussing the mail with the users, and then discusses the mail by means of other communication tools or in a face-to-face way, resulting in a complicated process and inefficient communication. In addition, the users may conduct the discussion in an area of the target mail after sharing the mail to the users, which can improve the efficiency of mail processing and the convenience of operation, thereby improving the user experience.

Based on the above technical solution, after the target link corresponding to the target mail is shared with each collaborative user, the target mail is marked as a shared mail.

The type of a mail may include a private mail, a shared mail and the like.

Figure 3:
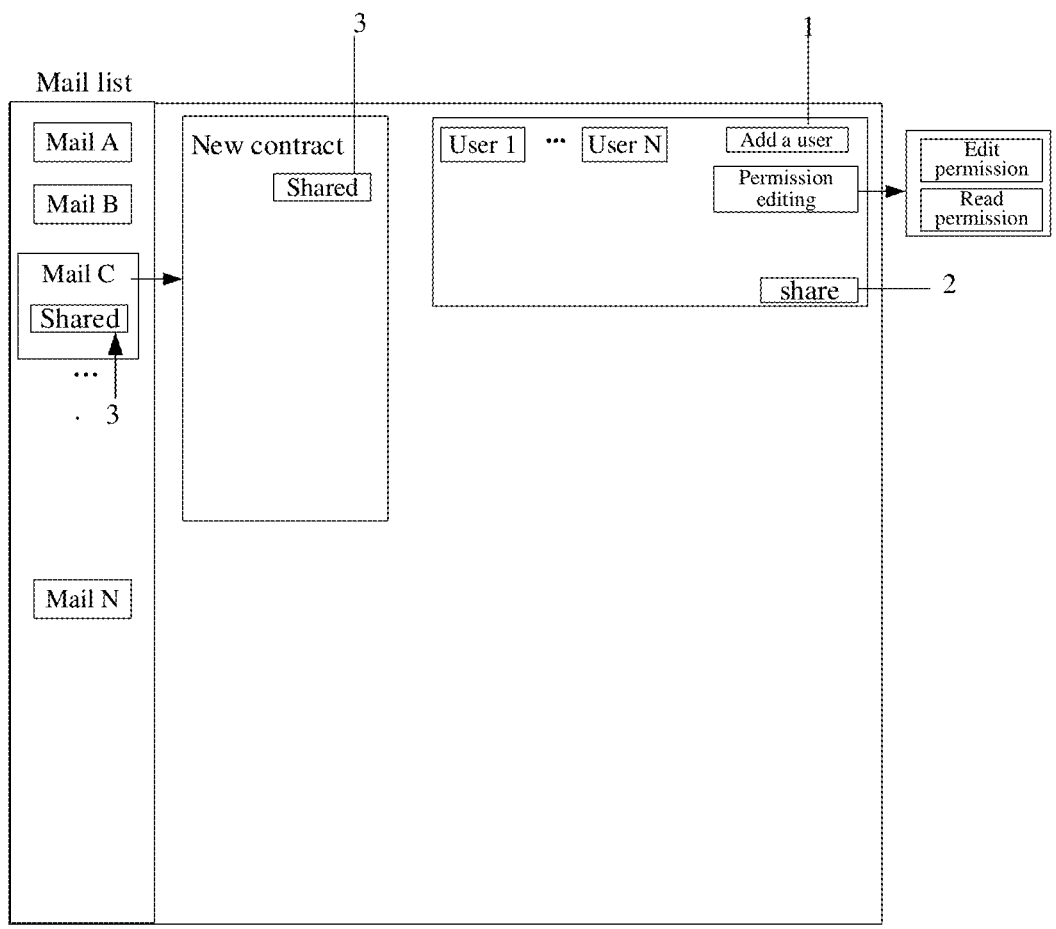
FIG. 3 is a schematic diagram of an interface used in the method for processing a mail according to the first embodiment of the present disclosure.

After the target link corresponding to the target mail is shared with each collaborative user, the shared target mail may be marked as shared mail. As shown in FIG. 3, after the target link is shared with the collaborative user, the target mail may be marked as "shared", which is indicated by the numeral 3 in FIG. 3.

Second Embodiment

Figure 4:
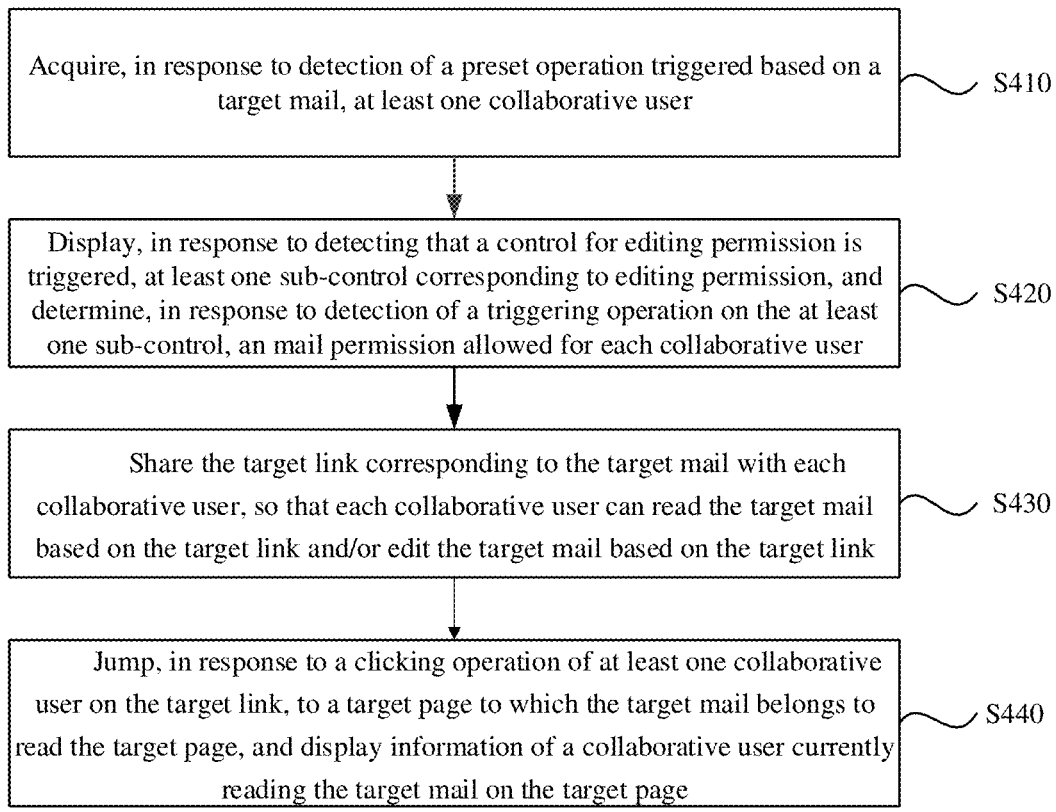
FIG. 4 is a schematic flow chart of a method for processing a mail according to a second embodiment of the present disclosure.

Based on the above technical solution, in order to determine a permission allowed for each collaborative user, an operation permission allowed for each collaborative user may be determined after determining the at least one collaborative user. FIG. 4 is a schematic flow chart of a method for processing a mail according to a second embodiment of the present disclosure. As shown in FIG. 4, the method includes the following steps S410 to S440.

In step S410, at least one collaborative user is acquired in response to detection of a preset operation triggered based on a target mail.

In step S420, in response to detecting that a control for editing permission is triggered, at least one sub-control corresponding to editing permission is displayed, and a mail permission allowed for each collaborative user is determined in response to detection of a triggering operation on the at least one sub-control.

The mail permission may be understood as permission allowed for a user to process a mail. In an embodiment, the mail permission includes at least one of edit permission and read permission with respect to the mail. The edit permission means that the user has permission to edit a mail, read a mail, and forward a mail to another user. The read permission means that the user only has permission to read a mail and cannot perform other operations. The number of sub-controls is related to the number of types of mail permission. For example, if the mail permission has two types, the number of the sub-controls is two.

In the embodiment, the target user may have permission of adding a collaborative user, deleting a collaborative user, sending a mail, and editing a draft. A user with the read permission is allowed to browse discussion information in the target mail and participate in the discussion of the target mail. The user with the read permission is not allowed to browse the draft in the draft control, and not allowed to reply and forward the mail. A user with the edit permission is allowed to browse the discussion information in the target mail and edit the mail in the draft control of the target mail. However, the user with the edit permission is not allowed to create a draft, and is not allowed to share the target mail with another user.

In order to pre-determine permission allowed for each collaborative user to process the mail, after determining the collaborative user, the mail permission allowed for the collaborative user may be edited.

After the collaborative user is determined, a permission editing control corresponding to each collaborative user may be triggered, to determine the mail permission allowed for each collaborative user based on the permission editing control. As shown in FIG. 2, if a permission editing control corresponding to a user A is triggered, at least two sub-controls, namely, a control for read permission and a control for edit permission, pop up in a display interface. If the target user triggers the control for read permission, the permission allowed for the user A is the read permission. If the target user triggers the control for edit permission, the permission allowed for the user A is the edit permission.

It should be noted that if the control for editing permission is not triggered, the mail permission allowed for at least one collaborative user may be set as a default permission for reading the mail, that is, allowing to read the target mail but not to edit the mail.

In step S430, the target link corresponding to the target mail is shared with each collaborative user, so that each collaborative user can read the target mail based on the target link and/or edit the target mail based on the target link.

After the collaborative user is determined and the mail permission allowed for each collaborative user is determined, the target user may trigger the sharing control. In response to the triggering operation of the target user detected by the server, the target link corresponding to the target mail may be generated, and the target link corresponding to the target mail may be sent to each collaborative user, so that each collaborative user can read the target mail online based on the target link, and the user with edit permission can edit the draft in the draft control of the target mail.

In the embodiment, the user with edit permission can edit the draft in the draft control of the target mail, and each collaborative user can preview the edited draft.

In step S440, in linking to a target page to which the target mail belongs in response to a clicking operation of at least one collaborative user on the target link, information of the collaborative user who is currently accessing the target mail is displayed on the target page.

When the target user triggers the sharing control, each collaborative user can receive the target link corresponding to the target mail. By triggering the target link, each collaborative user can link to the target page to which the target mail belongs through the target link. An avatar of a user currently reading the target mail may be displayed on the target page, that is, the avatar of the user, who is currently reading the target mail through the target link, is displayed on the target page, so that each user can determine the user(s) accessing the page to which the target mail belongs.

In the embodiment, the user with edit permission can edit the draft in the draft control of the target mail, and the avatar of the user currently editing the draft in the draft control may be displayed.

It should be noted that each target mail includes a single draft. The collaborative user with edit permission and the target user are allowed to edit the draft in the draft control of the target mail, and the edited draft may be previewed by multiple online users. When the user A is editing a draft, a cursor shows that the user currently editing the draft is the user A, so as to determine the user currently editing the draft in real time.

According to the conventional technology, additional software is needed when the collaborative users discuss the mail and thus switching among software is involved, resulting in inconvenience in usage of the mail and inefficiency in work. To solve the above problem, a discussion control is provided in the target mail, that is, the collaborative users can see the mail and discuss the content in the mail. In other words, a discussion icon is displayed on an interface to which the target mail belongs. When the target user triggers the discussion icon, a discussion dialog box pops up, and all users with permissions can discuss the mail in the discussion dialog box without any third-party software. In an embodiment, when the user with edit permission triggers the discussion control, the discussion dialog box pops up on the target page to which the target mail belongs, so that each collaborative user can discuss information in the discussion dialog box.

That is, after the target link corresponding to the target mail is shared with each collaborative user, the method further includes generating a communication control based on feedback of at least one collaborative user to the target link; and displaying, on the communication control, the number of messages sent by the collaborative user.

The feedback to the target link may be a communication request initiated by the collaborative user, and the communication control may be generated based on the communication request.

Each user with edit permission may open the target mail based on the target link and give the feedback to the target mail. In response to detection of a triggering operation of the collaborative user on the edited content, the communication control may be generated and the number of messages sent by the collaborative user may be displayed on the communication control.

In an embodiment, after the communication control is generated based on the feedback of at least one collaborative user to the target link, the method further includes generating, on receipt of a triggering operation on the communication control, a communication area in the page of the target mail, and displaying, in the communication area, the message sent by the collaborative user.

That is, on receipt of the triggering operation on the communication control by the collaborative user, the communication area may be generated, and the edited content by the collaborative user may be displayed on the communication area.

Figure 5:
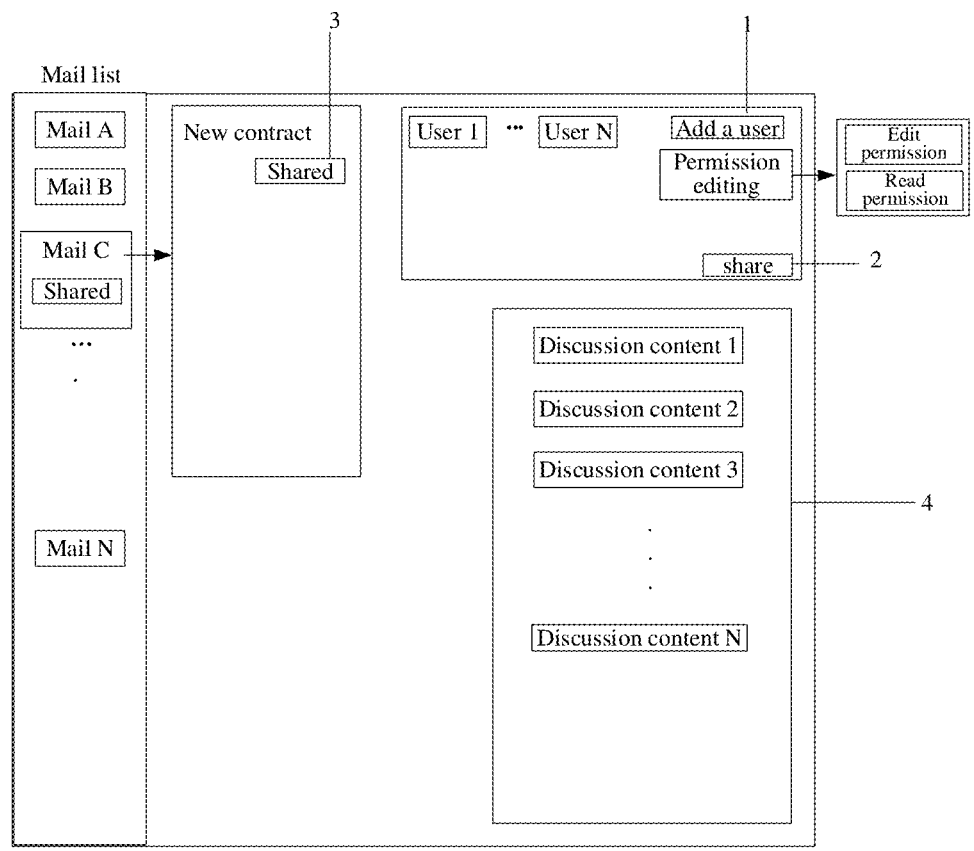
FIG. 5 is a schematic diagram of an interface used in the method for processing a mail according to the second embodiment of the present disclosure.

For example, as shown in FIG. 5, in response to the user with edit permission triggering the discussion control, the discussion dialog box marked by the reference numeral 4 may pop up on the display interface, so that the user with edit permission can discuss the mail in the discussion dialog box.

In the embodiment, after the draft reply to the target mail is finished, a confirmation control may be clicked to send the draft reply to other collaborative users.

According to the technical solution of the embodiment of the present disclosure, at least one collaborative user is acquired in response to detection of a preset operation triggered based on a target mail; a target link corresponding to the target mail is shared with each collaborative user, so that each collaborative user can read the target mail based on the target link and/or edit the target mail based on the target link; where the target mail includes at least one of content of the target mail and content of a draft reply to the target mail. The technical solution can solve the technical problem in the conventional technology that a user is required to forward a mail to relevant users when discussing the mail with the users, and then discusses the mail by means of other communication tools or in a face-to-face way, resulting in a complicated process and inefficient communication. In addition, the user may conduct the discussion in an area of the target mail after sharing the mail to the users, which can improve the efficiency of mail processing and the convenience of operation, thereby improving the user experience.

Third Embodiment

Figure 6:
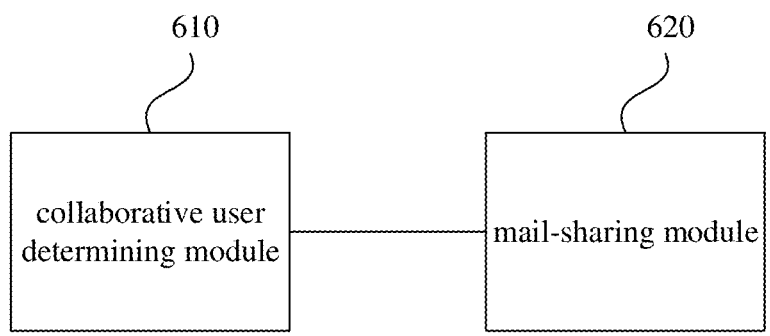
FIG. 6 is a schematic structural diagram of an apparatus for processing a mail according to a third embodiment of the present disclosure.

FIG. 6 is a schematic structural diagram of an apparatus for processing a mail according to a third embodiment of the present disclosure. As shown in FIG. 6, the apparatus includes a collaborative user determining module 610 and a mail-sharing module 620.

The collaborative user determining module 610 is configured to acquire, in response to detection of a preset operation triggered based on a target mail, at least one collaborative user. The mail-sharing module 620 is configured to share, in response to detection of a triggered sharing control, a target link corresponding to a target mail with each collaborative user, so that each collaborative user can read the target mail online based on the target link, and edit a draft in a draft control. The target mail includes content of the target mail and a draft control corresponding to the target mail.

According to the technical solution of the embodiment of the present disclosure, at least one collaborative user is acquired in response to detection of a preset operation triggered based on a target mail; a target link corresponding to the target mail is shared with each collaborative user, so that each collaborative user can read the target mail based on the target link and/or edit the target mail based on the target link; where the target mail includes at least one of content of the target mail and content of a draft reply to the target mail. The technical solution can solve the technical problem in the conventional technology that a user is required to forward a mail to relevant users when discussing the mail with the users, and then discusses the mail by means of other communication tools or in a face-to-face way, resulting in a complicated process and inefficient communication. In addition, the user may conduct the discussion in an area of the target mail after sharing the mail to the users, which can improve the efficiency of mail processing and the convenience of operation, thereby improving the user experience.

Based on the above technical solution, the mail-sharing module is further configured to display, on a page of the target mail, information of a user who is reading the target mail, based on feedback of at least one collaborative user to the target link.

Based on the above technical solution, the apparatus further includes: a module for generating a communication control, configured to generate, based on the feedback of the at least one collaborative user to the target link, a communication control; and a module for displaying the number of messages, configured to display, on the communication control, the number of messages sent by the collaborative user.

Based on the above technical solution, the module for generating a communication control includes a unit for generating a communication area and a unit for displaying a message. The unit for generating a communication area is configured to receive a triggering operation on the communication control and generate the communication area in the page of the target mail. The unit for displaying a message is configured to display, in the communication area, a message sent by the cooperation user.

Based on the above technical solution, the collaborative user determining module is further configured to display, in response to detecting that a control for editing permission is triggered, at least one sub-control corresponding to editing permission, and determine a mail permission allowed for each collaborative user in response to detection of a triggering operation on the at least one sub-control; and set, in a case that the control for editing permission is not triggered, the mail permission allowed for at least one collaborative user as a default permission. The mail permission includes edit permission and read permission to the mail. The default permission is the read permission to the mail.

Based on the above technical solution, the apparatus further includes a mail-marking module. The mail-marking module is configured to mark, after the target link corresponding to the target mail is shared with each collaborative user, the target mail as a shared mail.

Based on the above technical solution, the apparatus further includes a module for displaying user information. The module for displaying user information is configured to display, in response to detecting that the draft reply to the target mail is being edited by a collaborative user with edit permission, information of the collaborative user at a location where the editing occurs, where the user information includes at least one of a name and an avatar of the user.

Based on the above technical solution, the apparatus further configured to: send, after the draft reply to the target mail is finished, the draft reply to a recipient, where the collaborative user is different from the recipient; or the collaborative user is one of the recipient.

The apparatus for processing a mail according to the embodiment of the present disclosure may perform the method for processing a mail according to any one of the embodiments of the present disclosure, and has the corresponding functions and beneficial effects of the method.

It should be noted that the division of the units and the modules in the above apparatus is merely based on logical functions, and is limited to the above description, as long as the corresponding functions can be realized. In addition, the terms used for identifying the functional units are only to distinguish among the different units, and are not intended to limit the scope of protection of the embodiments of the present disclosure.

Fourth Embodiment

Figure 7:
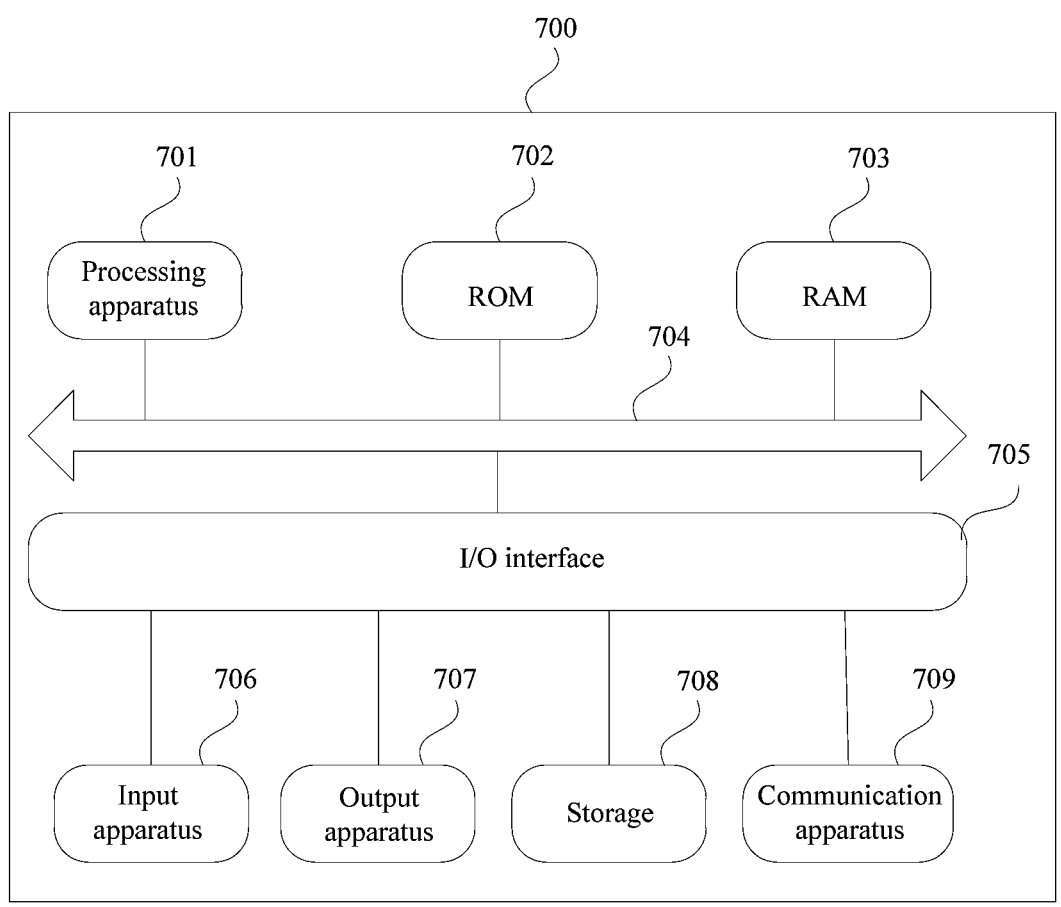
FIG. 7 is a schematic structural diagram of an electronic device according to a fourth embodiment of the present disclosure.

Reference is made to FIG. 7, which is a schematic structural diagram of an electronic device 700 (such as a terminal device or a server in FIG. 7) according to the embodiment of the present disclosure. The terminal device according to the embodiments of the present disclosure may include, but not limited to, a mobile phone, a laptop, a digital broadcast receiver, a PDA (personal digital assistants), PAD (tablet), a PMP (portable multimedia player), a vehicle-mounted terminal (such as in-vehicle navigation terminal) and other mobile terminals and fixed terminals such as a digital TV, a desktop computer. The electronic device shown in FIG. 7 is only exemplary, and should not indicate any limitation to the function and scope of application of the embodiments of the present disclosure.

As shown in FIG. 7, the electronic device 700 may include a processing apparatus (such as a central processing unit CPU or a graphics processor) 701, which may execute various operations and processing based on a program stored in a read only memory (ROM) 702 or a program loaded from a storage 708 into a random access memory (RAM) 703. The RAM 703 is further configured to store various programs and data required by the electronic device 700. The processing apparatus 701, the ROM 702 and the RAM 703 are connected to each other via a bus 704. An input/output (I/O) interface 705 is also connected to the bus 704.

Generally, the I/O interface 705 may be connected to: an input apparatus 706, such as a touch screen, a touch panel, a keyboard, a mouse, a camera, a microphone, an accelerometer, and a gyroscope; an output apparatus 707, such as a liquid crystal display (LCD), a speaker, and a vibrator; the storage 706 such as a magnetic tape and a hard disk; and a communication apparatus 709. The communication apparatus 709 enables wireless or wired communication between the electronic device 700 and other devices for data exchanging. Although FIG. 7 shows an electronic device 700 including various apparatuses, it should be understood that the illustrated apparatuses are not required to all be implemented or embodied. Alternatively, more or fewer apparatuses may be implemented or included.

Particularly, according to an embodiment of the present disclosure, the process described above in conjunction with flow charts may be implemented as a computer program. For example, a computer program product is further provided according to an embodiment of the present disclosure, including a computer program carried on a non-transient computer readable medium. The computer program includes program codes for performing the method shown in the flow chart. In the embodiment, the computer program may be downloaded and installed from the network via the communication apparatus 709, or installed from the storage 706, or installed from the ROM 220. The computer program, when being executed by the processing apparatus 701, implements the functions defined in the method according to the embodiment of the present disclosure.

The electronic device according to the embodiment of the present disclosure has a same invention concept as the method for processing a mail according to the above embodiments. For technical details not described in detail in the embodiment, reference may be made to the above embodiment, and the embodiment has a same beneficial effect as the above embodiment.

Fifth Embodiment

A computer storage medium having a computer program stored thereon is provided according to an embodiment of the present disclosure. The computer program, when being executed by a processor, implements the method for processing a mail according to the above embodiments.

It should be noted that, the computer readable medium according to the present disclosure may be a computer readable signal medium or a computer readable storage medium or any combination thereof. The computer readable storage medium may be, but not limited to, a system, an apparatus, or a device in an electronic, magnetic, optical, electromagnetic, infrared, or semi-conductive form, or any combination thereof. The computer readable storage medium may be, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to a wire, an optical cable, radio frequency and the like, or any proper combination thereof.

In some embodiments, a user terminal may communicate with a server via any currently known or future developed network protocol such as HTTP (hypertext transfer protocol), and the user terminal and the server are interconnected with digital data communication (such as, a communication network) in any form or medium. Examples of the communication network include a local area network (LAN), a wide area network (WAN), Internet, and an end-to-end network (such as, ad hoc end-to-end network), and any currently known or future developed network.

The computer readable medium may be in the electronic device, or may stand alone without being assembled into the electronic device.

The computer readable medium carries one or more programs. The one or more programs, when executed by the electronic device, cause the electronic device to:

acquire, in response to detection of a preset operation triggered based on a target mail, at least one collaborative user; and share a target link corresponding to the target mail with each collaborative user, in order that each collaborative user reads the target mail based on the target link and/or edits the target mail based on the target link, where the target mail includes at least one of content of the target mail and content of a draft reply to the target mail.

The computer program codes for performing the operations disclosed in the embodiments of the present disclosure may be written in one or more programming languages or combinations thereof. The programming languages include but not limited to an object-oriented programming language, such as Java, Smalltalk, and C++, and a conventional procedural programming language, such as C language or a similar programming language. The program codes may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block diagrams in the drawings illustrate the architecture, functions and operations that can be implemented by the system, method and computer program product according to the embodiments of the present disclosure. Each block in a flow chart or a block diagram may represent a module, a program segment, or a part of code, and part of the module, program segment, or part of code includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. A name of the unit/module does not constitute a limitation to the unit in some cases. For example, the collaborative user determining module may be described as "user determining module".

The functions described above herein may be performed at least partially by one or more hardware logic units. For example, non-limiting, an exemplary type of hardware logic component may be used, including a field programmable gate array (FPGA), an application specific integrated circuit (ASIC), an application specific standard product (ASSP), a system on chip (SOC), a complex programmable logic device (CPLD), and so on.

In the present disclosure, a machine-readable medium may be a tangible medium including or storing a program used in an instruction execution system, an apparatus, or a device or used in combination with an instruction execution system, a device, or an apparatus. The machine-readable medium may be a machine-readable signal medium or a machine-readable storage medium. The machine-readable medium may include, but are not limited to, a system, an apparatus, or a device in an electronic, magnetic, optical, electromagnetic, infrared, or semi-conductive form, or any combination thereof. More specifically, the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof.

According to one or more embodiments of the present disclosure, a method for processing a mail is provided according to a first example, the method includes:

acquiring, in response to detection of a preset operation triggered based on a target mail, at least one collaborative user; and sharing a target link corresponding to the target mail with each collaborative user, to allow each collaborative user to read the target mail based on the target link and/or edit the target mail based on the target link, where the target mail includes at least one of: content of the target mail and content of a draft reply to the target mail.

According to one or more embodiments of the present disclosure, a method for processing a mail is provided according to a second example. After the sharing a target link corresponding to the target mail with each collaborative user, the method further includes:

displaying, on a page of the target mail, information of each collaborative user who is reading the target mail, based on feedback of the at least one collaborative user to the target link.

According to one or more embodiments of the present disclosure, a method for processing a mail is provided according to a third example. After the sharing a target link corresponding to the target mail with each collaborative user, the method further includes:

generating, based on feedback of the at least one collaborative user to the target link, a communication control; and displaying, on the communication control, the number of messages sent by the collaborative user.

According to one or more embodiments of the present disclosure, a method for processing a mail is provided according to a fourth example. After the communication control is generated based on feedback of at least one collaborative user to the target link, the method further includes:

provide, on receipt of a triggering operation on the communication control, a communication area on the page of the target mail; and displaying, in the communication area, the message sent by the collaborative user.

According to one or more embodiments of the present disclosure, a method for processing a mail is provided according to a fifth example. After the acquiring at least one collaborative user, the method further includes:

displaying, in response to detecting that a control for editing permission is triggered, at least one sub-control corresponding to editing permission, and determining, in response to detection of a triggering operation on the at least one sub-control, a mail permission allowed for each collaborative user; and setting, in a case that triggering on the control for editing permission is not detected, the mail permission allowed for the at least one collaborative user as a default permission, where the mail permission includes an edit permission to the mail and a read permission to the mail, and the default permission is the read permission to the mail.

According to one or more embodiments of the present disclosure, a method for processing a mail is provided according to a sixth example. After the target link corresponding to the target mail is shared with each collaborative user, the method further includes marking the target mail as a shared mail.

According to one or more embodiments of the present disclosure, a method for processing a mail is provided according to a seventh example. The method further includes:

displaying, in response to detecting that the draft reply to the target mail is being edited by a collaborative user with edit permission, information of the collaborative user at a location where the editing occurs, where the user information includes at least one of a name and an avatar of the user.

According to one or more embodiments of the present disclosure, a method for processing a mail is provided according to an eighth example. The method further includes:

sending, after the draft reply to the target mail is finished, the draft replay to a recipient, where the collaborative user is different from the recipient; or the collaborative user is one of the recipient.

According to one or more embodiments of the present disclosure, an apparatus for processing a mail is provided according to a ninth example. The apparatus includes:

a collaborative user determining module, configured to: acquire, in response to detection of a preset operation triggered based on a target mail, at least one collaborative user; and an mail-sharing module, configured to: share a target link corresponding to the target mail with each collaborative user, to allow each collaborative user to read the target mail based on the target link and/or edit the target mail based on the target link, where the target mail includes at least one of: content of the target mail and content of a draft reply to the target mail.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features (but not limited to) having similar functions as disclosed.

In addition, although the operations are described in a specific order, it should not be understood that these operations are required to be performed in the specific order or performed in a sequential order. In some conditions, multi-tasking and parallel processing may be advantageous. Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for processing a mail, comprising:

acquiring, in response to detection of a preset operation triggered based on a target mail, at least one collaborative user; and sharing a target link corresponding to the target mail with each collaborative user, in order to allow each collaborative user to read the target mail based on the target link and/or to edit the target mail based on the target link, wherein the target mail comprises at least one of: content of the target mail and content of a draft reply to the target mail, wherein after sharing the target link corresponding to the target mail with each collaborative user, the method further comprises:

generating, based on feedback of the at least one collaborative user to the target link, a communication control; and displaying, on the communication control, a number of messages sent by the collaborative user, wherein the method further comprises:

providing a discussion control in the target mail; and in response to triggering on the discussion control in the target mail, popping up a discussion dialog box to allow the at least one collaborative user to discuss the target mail in the discussion dialog box.

2. The method according to claim 1, wherein after sharing the target link corresponding to the target mail with each collaborative user, the method further comprises:

displaying, on a page of the target mail, information of each collaborative user accessing the target mail, based on feedback of the at least one collaborative user to the target link.

3. The method according to claim 2, wherein the displaying, on a page of the target mail, information of each collaborative user accessing the target mail, based on feedback of the at least one collaborative user to the target link comprises:

jumping, in response to a clicking operation of at least one collaborative user on the target link, to a target page to which the target mail belongs; and displaying, on the target page, information of each collaborative user accessing the target mail.

4. The method according to claim 1, wherein after generating, based on feedback of at least one collaborative user to the target link, the communication control, the method further comprises:

generating, on receipt of a triggering operation on the communication control, a communication area; and displaying the message sent by the collaborative user in the communication area.

5. The method according to claim 4, wherein the generating, on receipt of a triggering operation on the communication control, a communication area comprises:

generating, on receipt of the triggering operation on the communication control, the communication area on the page of the target mail.

6. The method according to claim 1, wherein after acquiring at least one collaborative user, the method further comprises:

displaying, in response to detecting that a control for editing permission is triggered, at least one sub-control corresponding to editing permission, and determining, in response to detection of a triggering operation on the at least one sub-control, a mail permission allowed for each collaborative user; and setting, in a case that triggering on the control for editing permission is not detected, the mail permission allowed for the at least one collaborative user as a default permission.

7. The method according to claim 6, wherein the mail permission comprises: an edit permission to the target mail and a read permission to the target mail, and the default permission is the read permission to the target mail.

8. The method according to claim 1, wherein after sharing the target link corresponding to the target mail with each collaborative user, the method further comprises:

marking the target mail as a shared mail.

9. The method according to claim 6, further comprising:

displaying, in response to detecting that the draft reply to the target mail is being edited by a collaborative user with edit permission, information of the collaborative user at a location where the editing occurs.

10. The method according to claim 1, further comprising:

sending, after the draft reply to the target mail is finished, the draft reply to a recipient, wherein the collaborative user is different from the recipient; or the collaborative user is one of the recipient.

11. The method according to claim 1, wherein the preset operation comprises adding at least one collaborative user.

12. An electronic device, comprising:

one or more processors; and a memory for storing one or more programs, wherein the one or more processors are configured to, when executing the one or more programs, perform:

acquiring, in response to detection of a preset operation triggered based on a target mail, at least one collaborative user; and sharing a target link corresponding to the target mail with each collaborative user, to facilitate each collaborative user to read the target mail based on the target link and/or edit the target mail based on the target link, wherein the target mail comprises at least one of: content of the target mail and content of a draft reply to the target mail, wherein the one or more processors are further configured to, when executing the one or more programs, perform:

after sharing the target link corresponding to the target mail with each collaborative user, generating, based on feedback of the at least one collaborative user to the target link, a communication control; and displaying, on the communication control, a number of messages sent by the collaborative user, wherein the one or more processors are further configured to, when executing the one or more programs, perform:

providing a discussion control in the target mail; and in response to triggering on the discussion control in the target mail, popping up a discussion dialog box to allow the at least one collaborative user to discuss the target mail in the discussion dialog box.

13. The electronic device according to claim 12, wherein the one or more processors are further configured to, when executing the one or more programs, perform:

after sharing the target link corresponding to the target mail with each collaborative user, displaying, on a page of the target mail, information of each collaborative user accessing the target mail, based on feedback of the at least one collaborative user to the target link.

14. The electronic device according to claim 13, wherein the one or more processors are further configured to, when executing the one or more programs, perform:

jumping, in response to a clicking operation of at least one collaborative user on the target link, to a target page to which the target mail belongs; and displaying, on the target page, information of each collaborative user accessing the target mail.

15. The electronic device according to claim 12, wherein the one or more processors are further configured to, when executing the one or more programs, perform:

after acquiring at least one collaborative user, displaying, in response to detecting that a control for editing permission is triggered, at least one sub-control corresponding to editing permission, and determining, in response to detection of a triggering operation on the at least one sub-control, a mail permission allowed for each collaborative user; and setting, in a case that triggering on the control for editing permission is not detected, the mail permission allowed for the at least one collaborative user as a default permission.

16. The electronic device according to claim 12, wherein the one or more processors are further configured to, when executing the one or more programs, perform:

after sharing the target link corresponding to the target mail with each collaborative user, marking the target mail as a shared mail.

17. The electronic device according to claim 12, wherein the one or more processors are further configured to, when executing the one or more programs, perform:

sending, after the draft reply to the target mail is finished, the draft reply to a recipient, wherein the collaborative user is different from the recipient; or the collaborative user is one of the recipient.

18. A non-transitory storage medium comprising computer executable instructions, wherein the computer executable instructions, when being executed by a computer processor, cause the computer processor to:

acquire, in response to detection of a preset operation triggered based on a target mail, at least one collaborative user;

share a target link corresponding to the target mail with each collaborative user, in order to allow each collaborative user to read the target mail based on the target link and/or to edit the target mail based on the target link, wherein the target mail comprises at least one of: content of the target mail and content of a draft reply to the target mail;

generate, based on feedback of the at least one collaborative user to the target link, a communication control; and display, on the communication control, a number of messages sent by the collaborative user, wherein the computer executable instructions, when being executed by a computer processor, further cause the computer processor to:

provide a discussion control in the target mail; and in response to triggering on the discussion control in the target mail, pop up a discussion dialog box to allow the at least one collaborative user to discuss the target mail in the discussion dialog box.

* * * * *